No. 648,628. Patented May 1, 1900.
J. F. McCANNA.
LUBRICATING PUMP.
(Application filed Nov. 4, 1899.)
(No Model.) 2 Sheets—Sheet 2.
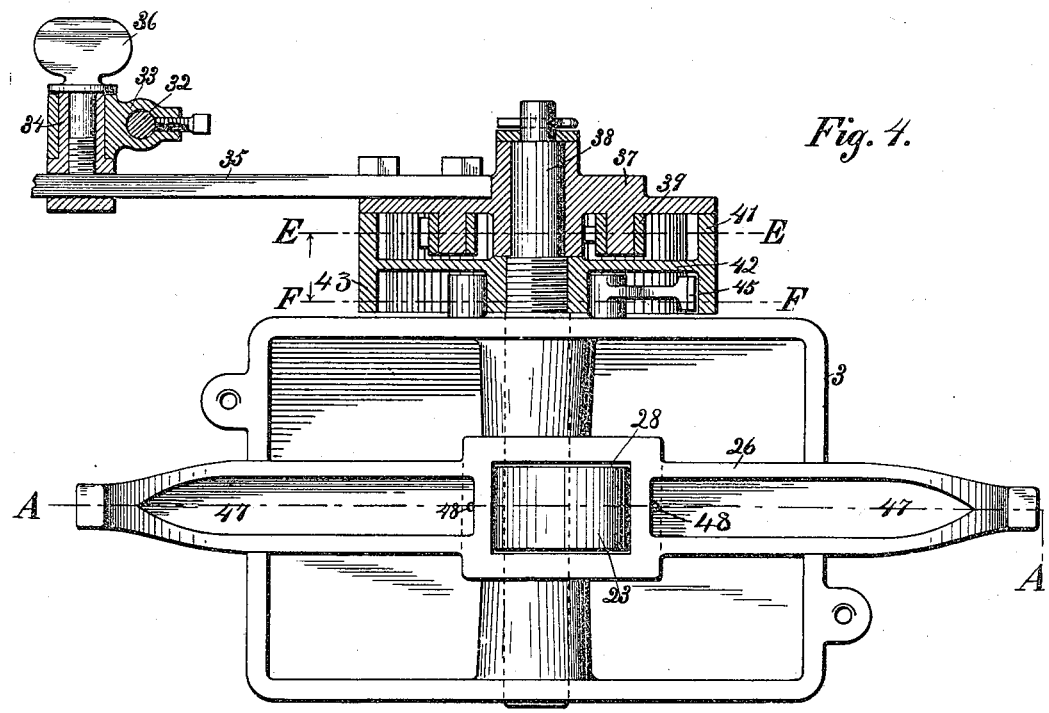
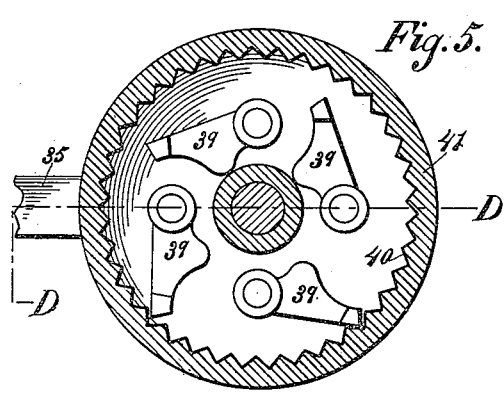
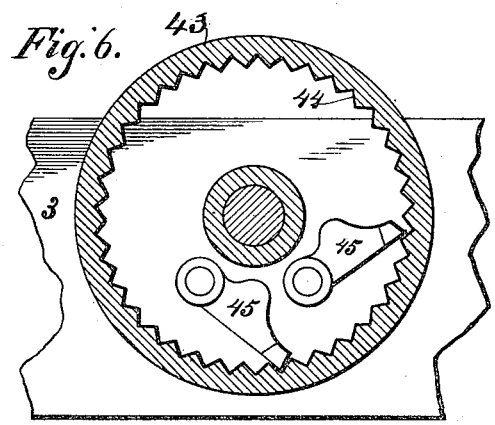
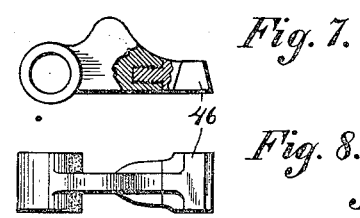
Witnesses:
W. C. Corlies
W. H. Cotton
Inventor:
John F. McCanna.
By Coburn, Hibben & McElroy,
Attys.

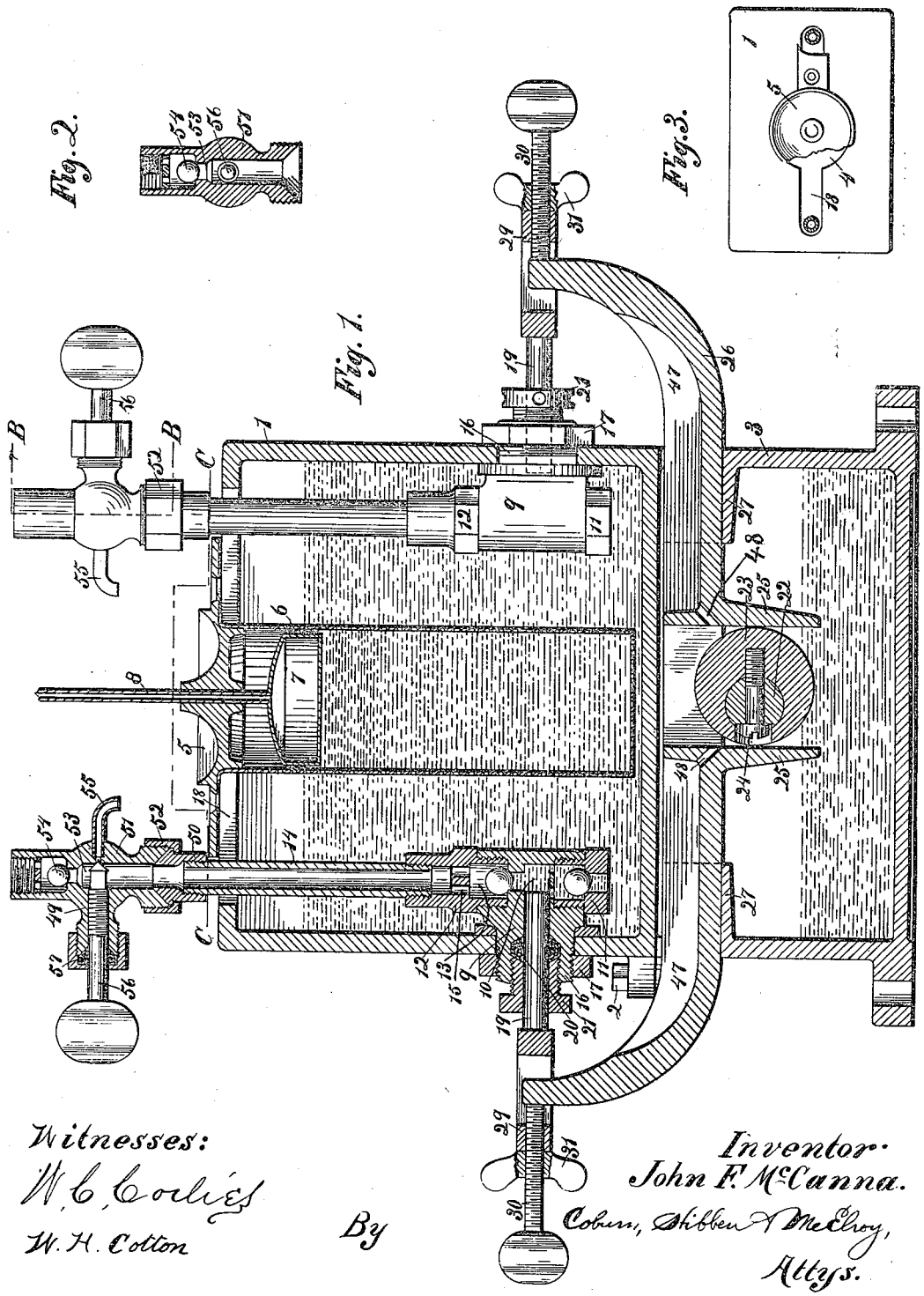

UNITED STATES PATENT OFFICE.

JOHN F. McCANNA, OF CHICAGO, ILLINOIS, ASSIGNOR OF ONE-HALF TO THE PHENIX METALLIC PACKING COMPANY, OF SAME PLACE.

LUBRICATING-PUMP.

SPECIFICATION forming part of Letters Patent No. 648,628, dated May 1, 1900.

Application filed November 4, 1899. Serial No. 735,760. (No model.)

*To all whom it may concern:*

Be it known that I, JOHN F. McCANNA, a resident of Chicago, in the county of Cook and State of Illinois, have invented certain new and useful Improvements in Lubricating-Pumps, of which the following is a specification.

My invention relates to certain new and useful improvements in what are known as "lubricating-pumps," which are small pumps ordinarily operated from some reciprocating part of a steam-engine and employed to pump oil to any parts that it is desired to have constantly and uniformly lubricated.

Referring to the sheets of drawings, in which the same letters of reference are used to designate identical parts in all the views, Figure 1 is a central vertical section, as on the line A A of Fig. 4. Fig. 2 is a detail view in section on the line B B of Fig. 1. Fig. 3 is a plan view, on a smaller scale, on the line C C of Fig. 1. Fig. 4 is a plan view with the reservoir removed and the clutch mechanism in section on the line D D of Fig. 5. Fig. 5 is a sectional view through the clutch mechanism on the line E E of Fig. 4. Fig. 6 is a similar view on the line F F of Fig. 4. Fig. 7 is a side elevation, partly broken away, of one of the pawls employed in the clutch mechanism; and Fig. 8 is a plan view of the same.

The reservoir 1, which contains the oil or other lubricating material, may be of the rectangular shape shown, although any other shape might be employed. I have shown this reservoir 1 as secured by the screws 2 or otherwise on the hollow rectangular base portion 3. The top of the reservoir 1 has the circular aperture 4 therein, in which aperture fits the cylindrical perforated strainer 6, the upper end of which is closed by the cap 5. This strainer 6 has therein the customary float 7, which has the stem 8 projecting through an aperture in the cap, so that the stem 8 will indicate the amount of oil contained in the reservoir. I preferably form this float of sheet metal, which is constructed to form a short hollow cylinder, and the stem 8 is preferably hollow to admit the air freely to the center of the float.

The pumping mechanism proper consists of the irregular-shaped piece 9, which has the interiorly-screw-threaded openings in its bottom and top and the passage 10 connecting them, which passage is enlarged at the bottom, as seen. The screw-threaded valve-seat 11 is screwed into the bottom of the piece 9, and the ball-valve coöperates therewith, as will be readily apparent. The valve-seat formed by the upper end of the passage 10 is closed by another ball-valve. The connecting-piece 12 is screwed into the upper end of the piece 9 and has the aperture 13, formed in its lower side, of a size sufficient to accommodate the movements of the inclosed ball-valve. The pipe 14, which is screwed into its upper end, serves to carry the oil to any desired place, and the holes 15, bored through the central portion of the connecting-piece 12, permit the passage of the oil upward into the tube 14. The piece 9 has the preferably-cylindrical portion 16 projecting out through a similarly-shaped aperture in the side of the reservoir 1, and the nut 17, coöperating with the screw-threaded end of the cylindrical portion 16, serves to hold the piece 9 and its connected parts in position. When it is desired to take the pump out for any purpose, if the cap 5 and the strainer 6 have been removed by lifting them out and the nut 17 taken off the pipe 14 can be moved toward the center of the reservoir, the slots 18, forming extensions of the opening 4, permitting this movement. When the pump has thus been disconnected and moved to the center, it can be lifted out, the size of the opening 4 being sufficient to permit this. Of course the reverse method is employed in assembling the parts. The piston 19 reciprocates in the bearing formed in the piece 9 and through the stuffing-box 20, which is closed by the gland 21, screwed into the cylindrical end 16 of the piece 9.

To reciprocate the piston 19 the shaft 22, which is mounted in suitable bearings in the base portion 3, is slowly rotated by means to be subsequently described, and this shaft 22 has secured thereon an eccentric or lug 23, which is shown as fastened thereon by the screw 24, passing through the shaft and into the eccentric. As the shaft 22 rotates the eccentric 23 coöperates with the interior bearing-surfaces of the downwardly-projecting lugs 25, which are carried by the slide 26, which reciprocates in the ways 27, formed in the ends of the base portion 3. A rectangular aperture 28 is formed in the slide 26 to permit the necessary rotation of the eccentric-lug 23. The ends of the slide 26 are turned upward, as shown in Fig. 1, and take into the apertures formed in the yokes 29, secured to the outer ends of the pistons 19. In the outer ends of the yokes 29 are located screws 30 and the jam-nuts 31, and it will be readily seen that by the location of the movable abutment formed by the screws 30 the amount of lost motion between the slide 26 and the pistons 19 can be readily regulated, so that it shall vary from no lost motion to one in which all of the motion is lost—i. e., in which the operation of the slide does not affect the pistons. This capacity for adjustment is of great importance, as the amount of oil pumped in a given time can be accurately regulated thereby, and in case a plurality of pumps are actuated by the same slide, as shown, any or all of the pumps may be thrown out of operation, as desired, without affecting the operation of the others.

To rotate the shaft 22, I employ the following mechanism: The rod 32 is supposed to be attached to any part of the engine, so as to be reciprocated thereby, and this rod is secured in any desired position to the member 33, which is pivotally mounted upon the bearing 34, which can be secured to the swinging bar 35 in any desired position of adjustment by means of the set-screw 36. This bar 35 is rigidly secured to the disk 37, which is pivotally mounted upon the elongated bearing formed by the reduced outer end 38 of the shaft 22. This disk 37 has pivotally secured upon its inner face a plurality of pivoted dogs or pawls 39, which coöperate with the serrations or teeth 40, formed on the inner periphery of the flange 41, formed upon the disk or plate 42, which is rigidly secured upon the shaft 22 adjacent to the side of the base portion 3. The flange 43, which is similar to the flange 41, but formed on the other side of the disk 42, has the serrations or teeth 44, which coöperate with the pawls 45, which are pivotally mounted upon the outer face of the adjacent side of the base portion 3. These pawls 39 and 45 are pivoted to swing freely, and it will be seen that as the bar 35 is swung in one direction the pawls 39, coöperating with the teeth 40, will carry the disk 42 with them, while the pawls slip over the serrations during the backward movement of the bar 35, the disk 42 being held from any possible backward movement by the action of the pawls 45 coöperating with the serrations 44. To prevent the clicking of the pawls over the serrations, instead of making the pawls entirely of metal I prefer to form their outer ends 46 of hard wood, these tips being screwed into suitable apertures formed in the metallic body portions thereof. The substitution of the wooden tips serves to reduce materially the clicking produced by the passage of the pawls over the teeth.

The operation of the complete device will be readily apparent, as the reciprocation of the bar 35 will by the means just described serve to rotate the shaft 22 slowly, which in turn, by means of the eccentric-lug 23, reciprocates the slide 26 slowly, thus operating the connected pumps to an extent depending upon the adjustment of the screws 30.

As there is always a certain amount of gradual leakage out of the stuffing-boxes 20, I provide the slide 26 with the grooves 47 directly beneath the stuffing-boxes, and these grooves carry the waste oil and discharge it through the apertures 48 into the chamber formed in the base portion 3 of the pump. This oil is discharged upon the bearing-surfaces, and even if it were not the oil which gradually accumulates in the chamber will eventually become deep enough so that the eccentric-lug 23 in its rotation will take into the oil and carry with it enough to thoroughly lubricate the bearing-surfaces of the lugs 25 with which it contacts.

To ascertain at any time the rate at which the oil is being pumped, I provide the sight-feed construction illustrated in Figs. 1 and 2, where the pipe 14 has interposed therein the valve mechanism 49, which consists of the connecting member 50, to which the valve-body 51 is secured by the screw-threaded nut 52. This valve-body 51 has the passage-way 53 therethrough, and this passage is provided with the valve 54, coöperating with the seat formed by the upper end of the passage-way 53 to prevent the return of the oil when the valve is adjusted, as subsequently explained. A small discharge-pipe 55 is let into the side of the valve-body 51, and the valve-stem 56, which operates through the stuffing-box 57, has its inner end beveled so as to coöperate with the passage leading from the pipe 55 to the main passage-way 53. It will be readily perceived that when the stem 56 is turned, so as to open the passage to the pipe 55, the oil pumped up will be discharged through the pipe 55, instead of raising the valve 54 against the pressure of the oil above it. When the rate of feed has been ascertained, the valve-stem 56 is screwed in, its beveled end closing the passage-way completely and preventing any possible leakage. This construction I have substituted for the three-way-cock arrangement customarily employed for this purpose, and by means of this structure I am enabled to overcome the leakage which always occurs after the three-way-valve mechanism has been in operation for a short time.

As previously stated, the amount of the feed can be readily and easily regulated by means of the adjustment of the screw 30, and it will be understood that I might, if desired, employ only one pump in the reservoir instead of the two shown, and it will be readily apparent that by branching the slide 26 four or more pumps may be employed in the same reservoir and actuated from the same mechanism.

Having thus described my invention, what I claim as new, and desire to secure by Letters Patent of the United States, is—

1. In a lubricator, the combination with the pumping mechanism, of a discharge-pipe, and mechanism located in said discharge-pipe capable of use to show the rate of feed comprising the valve-body, the discharge-pipe 55 let into said body, the check-valve located in the body and beyond said pipe 55, and the needle-valve stem 56 coöperating with the valve-seat leading to the pipe 55.

2. In a lubricator, the combination with the reservoir having an aperture in the top thereof, of pumping mechanism connected to said reservoir, a discharge-pipe leading from said reservoir and connected with the pumping mechanism, mechanism located in said discharge-pipe capable of use to show the rate of feed comprising the valve-body, the discharge-pipe 55 let into said body and terminating over the aperture in the reservoir, the check-valve located in said body beyond the pipe 55, and the needle-valve stem 56 coöperating with the valve-seat leading to the pipe 55.

3. In a lubricator, the valve-body 49 having the passage 53 therethrough, the check-valve 54 closing the upper end thereof, the valve-stem 56 screw-threaded into said valve-body, and the discharge-pipe 55 let into said valve-body opposite to the valve-stem 56, substantially as and for the purpose described.

JOHN F. McCANNA.

Witnesses:
 LOUISE E. SERAGE,
 R. W. ALLEN.